Jan. 12, 1965  B. R. OXEL  3,164,860
APPARATUS FOR UNIFORMLY MIXING AND
CHARGING A SUBSTANCE INTO A MOLD
Filed Nov. 9, 1961  2 Sheets-Sheet 1
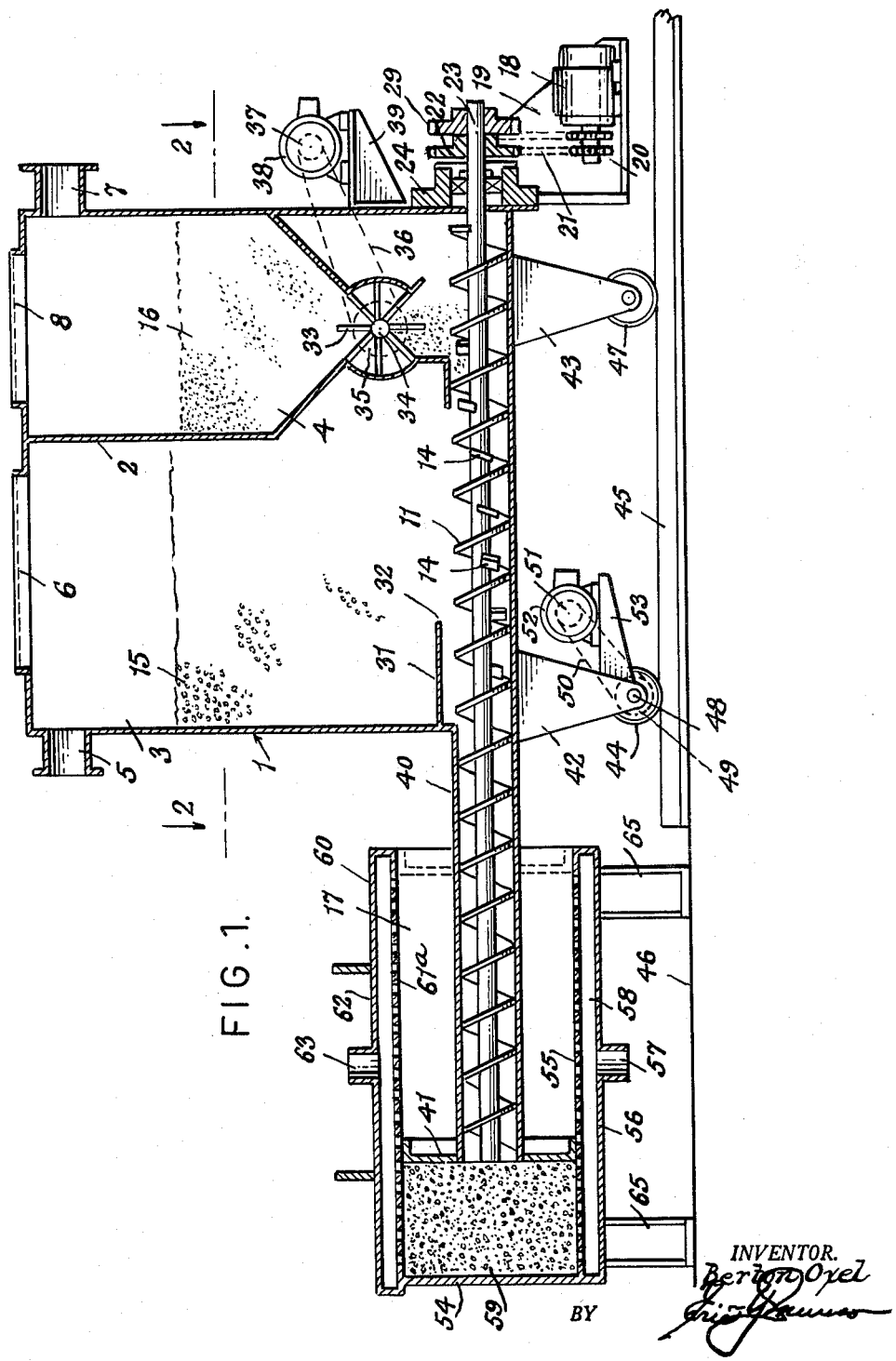
INVENTOR.
Berton Oxel
BY
Attorney

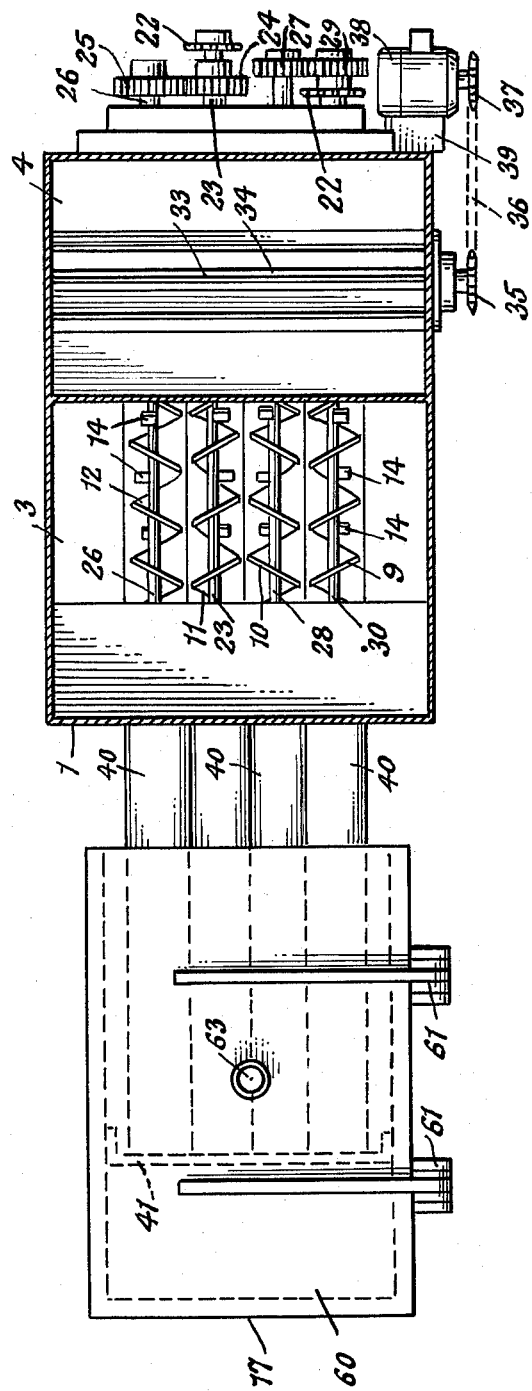

United States Patent Office 3,164,860
Patented Jan. 12, 1965

3,164,860
APPARATUS FOR UNIFORMLY MIXING AND CHARGING A SUBSTANCE INTO A MOLD
Berton Rogan Oxel, New Castle, Pa., assignor to Dyfoam Corporation, New Castle, Pa., a corporation of Pennsylvania
Filed Nov. 9, 1961, Ser. No. 151,368
6 Claims. (Cl. 18—5)

This invention relates to an apparatus for uniformly mixing substances of different densities and/or different particle size for making sheet and other material useful for many purposes, such as insulation, and to an improved product composed of a synthetic thermoplastic, such as expandable polystyrene beads combined with other material, such as polyurethane and also with substances, such as vermiculite, perlite or other mineral substances, such as aluminum slivers, glass fibers, asbestos fibers and wood fibers, and even liquid substances such as rubber thermoplastic material dissolved in a solvent that will not affect the particles mixed.

Expanded polystyrene and other similar thermoplastic materials are employed for many useful purposes, but when used alone and without the addition of some sort of binding or supporting material, its tendency to crumble or disintegrate often becomes evident, particularly at high temperatures. It is therefore desirable, for some purposes and particularly when the thermoplastic beads are used in the production of a board or sheet, that some additional and possibly heavier material be mixed with it, which material will have such characteristics as to enable it to provide tenacity and body tending to hold the expanded thermoplastic beads together in a manner to retard crumbling and provide a mixture of strength and durability.

It is therefore one of the objects of the present invention to provide an apparatus by which the pre-expanded synthetic thermoplastic material such as polystyrene beads, and materials of different densities and/or different particle size, such as vermiculite, perlite and other mineral as well as metal substances and plastic substances in liquid form will be thoroughly mixed or blended together and can be conveyed directly by the mixing or blending means into a molding section wherein the mixed material will be subjected to heat and controlled and regulated pressure, resulting in further expansion and in the consolidation of the ingredients.

It is further object of the invention to provide a mixing apparatus for the mixture of two materials of different densities and by which the normal tendency of the material of greater density to descend to the bottom of the mixing chamber will be greatly retarded, with the result that the mixture that is fed to the molding chamber or between molding belts, such as is suggested for example in co-pending application for patent Serial No. 576,052, filed April 4, 1956, and now abandoned, will be one in which the heavier material will be equally distributed throughout the molded product.

More particularly, the invention includes the provision of a mixing and feeding unit, including a multi-section hopper in which the different materials are separately contained; in spiral conveying means located below the hopper at the outlets of the same; of means for regulating the feeding of at least one of the materials to the conveying means; of elements provided on the spiral conveyers for assuring a complete mixture of the ingredients; of a heated mold chamber in which the mixture is deposited by the conveying means, the mold chamber including a movable mold wall that is operative to compress the material between it and a fixed mold wall, and in means for coupling the unit to the movable mold wall, and in means for moving the mixing and feeding unit in a manner to cause the regulatable compression of the material in the mold chamber between the movable and fixed walls of the same. It should, of course, be understood that instead of moving the mixing and feeding units, the latter may remain stationary and instead the mold chamber may be moved relative to the mixing and feeding units.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a vertical sectional view of an apparatus constructed in accordance with the invention, and FIG. 2 is a horizontal sectional view, taken substantially on the line 2—2 of FIG. 1, looking in the direction of the arrows.

According to the present embodiment of the invention as disclosed in the drawings, the improved apparatus contemplates the feeding of the different materials from two separate hopper compartments into a gang of spiral screw feeders or conveyers which not only tend to feed these materials to the molding means, but which because of mixing elements provided on the shafts of the screw conveyers, tend to secure complete mixture of the materials and this despite the fact that one of the materials is heavier than the other and hence exhibits a tendency to descend to the bottom of the mixing chamber.

The materials thus thoroughly mixed as above stated are conveyed by the spiral or screw conveyers to a molding section, an example of which is disclosed at the left in both figures of the drawings, and in which the application of heat and pressure on the mixed material takes place.

The apparatus includes a hopper, generally indicated at 1, which is divided by a vertical partition 2, into the two chambers generally indicated respectively at 3 and 4. Chamber 3 contains the synthetic plastic material which may be pre-expanded polystyrene beads 15 or globules of, for example, a density of one pound per cubic foot. This chamber of the hopper is filled with the polystyrene through an inlet 5, through which the material can if desired, be airborne, permitting the material to drop down into the chamber 3, while the air escapes through the screen top 6 provided on the chamber 3.

The chamber 4 of the hopper receives the mineral or other particles hereinbefore mentioned, such as particles 16. These expanded granules are loaded into the chamber 4 through the inlet 7, through which this material can be airborne, the material falling down into the chamber 4, while the air escapes through the screen top 8.

Located at the lower end of the hopper 1 are four screw conveyers, indicated respectively at 9, 10, 11 and 12 in FIG. 2. It should be understood, however, that a lesser or greater number of screw conveyers may be used. Material received from the chambers 3 and 4 is received by these conveyers; is stirred or mixed by the mixing blades 14 provided on the shafts of the screw conveyers and is moved by the conveyers into a molding chamber 17.

The four screw conveyers are rotated by means of a variable-speed electric motor 18 mounted on a supporting bracket 19, said motor having its shaft provided with a double sprocket 20, engaged by a chain 21 extending to a sprocket 22 provided on a shaft 30 of the screw conveyer 9. Screw conveyer shaft 30 carries a gear 29 which is in mesh with and drives a gear 27 on the shaft 28 of the screw conveyer 10. Screw conveyers 11 and 12 are thus driven in opposite directions, but since these conveyers are of opposite thread, the feed of the material by both of them will be in the same direction or toward and into the molding chamber 17. Gear 24 is in mesh with and drives a gear 25 mounted on the shaft 26 of the screw conveyer 12 which is thus driven on the same direction as the screw conveyor 10. Gear 29 is in mesh with and drives a gear 27 on the shaft 28 of the screw conveyer 10 and thus rotatively drives said conveyer in the same direction as conveyer 9.

The bottom wall 31 of the chamber 3 of the hopper is apertured as shown at 32 so that the polystyrene beads or globules will be received by the screw conveyers and moved thereby toward the left as viewed in FIG. 1. Rotatively mounted in the lower outlet end of the chamber 4 is a paddle-wheel feeder 33, the same extending across the lower end of the chamber 4 and having its shaft 34 provided with a sprocket 35 engaged by a drive chain 36, extending from a sprocket 37 provided on the shaft of a variable speed electric motor 38, mounted on a supporting bracket 39. This arrangement is such that by the speed of rotation of the paddle-wheel feeder and the capacity of the pockets in the feeder, the proportion of the vermiculite or other material particles 16 to the polystyrene beads is regulatable. For example, 1 to 1½ per lb. per cubic foot of the polystyrene to 6 lbs. per cubic foot of the vermiculite, might be used.

The four screw conveyers 9 to 12 inclusive extend beyond the hopper 1 in tubes or sleeves 40 which enter into the interior of the mold chamber 17 and connect to and pass through a movable mold wall 41 closely fitting within the molding chamber 17 and movable as a piston within the same. To effect the axial movement of the mold wall 41 within the mold chamber 17, the feeding apparatus is made movable as a unit. For this purpose, the hopper 1 and the parts associated therewith are provided with legs 42 and 43, the legs 42 having wheels 44 supported on rails 45 mounted on a floor or other support 46. Wheels 47 are carried by axles in the legs 43 which wheels also ride on the rails 45.

The axle 48 on which the wheels 44 are mounted, carries a sprocket 49 engaged by a chain 50 extending over a sprocket 51 carried by the shaft of a variable speed motor 52 supported on the bracket 53. This arrangement is such that by the operation of the motor 52 the mold wall 41 can be moved from the dotted line position shown in FIG. 1 to any desired position with respect to the fixed end wall 54 provided on the mold chamber 17.

The mold chamber is supported on the legs 65 and has an inner foraminous wall 55 jacketed by an outer wall 56, with a steam inlet 57 communicating with the space 58 located between the walls and causing the steam to pass through the perforations in the inner wall 55 to reach and expand the mixed materials 59 contained in the mold chamber and under pressure by the movable mold wall 41. A cover member 60 is hinged at 61 to the top of the mold chamber, the cover having an inner foraminous wall 61a and an outer jacketing wall 62, the steam entering into the space between the walls 61a and 62 and reaching the mixed material 59 by passage through the openings in the wall 61.

From the foregoing, the operation of the improved apparatus and method will be readily understood.

The beads of the thermoplastic material such as those of polystyrene, are rounded and are usually of a diameter of approximately .1 to 6 mm. As a result, they roll readily and operate with very little friction against the blades of the screw conveyers. This friction is increased somewhat by the addition of the vermiculite. As the mixture is conveyed by the screws, the friction between the material and the screw blades and the walls of the channels in which the blades operate is further increased and compression is produced. The maximum compression imposed on the mixture is, of course, produced in the mold chamber 17.

The beads of the thermoplastic material, or polystyrene, descend in the chamber 3 to reach the screw conveyers, and they mix with the particles of the other material, such as vermiculite that are fed to the screw conveyers in regulatable quantity by means of the paddle-wheel feeder 33. The mixing blades 14 provided on the shafts of the several screw conveyers are effective to secure thorough mixing of the two different materials, and this despite the greater weight of the one of them, as such materials are being fed by the screw conveyers and into the mold chamber 17.

The mixed materials, thus moved and mixed by the screw conveyers, are forced thereby into the mold chamber and are compressed between the movable mold wall 41 and the fixed mold wall 54. The desired and regulatable compression is produced by movement of the mixing and conveying unit toward the left in FIG. 1 while the material is being fed into the mold chamber until the required degree of pressure is reached, the steam injected into the mold provides for a baking and expansion of the mixture at a temperature of 100 to 120 degrees centigrade and results in an improved product.

Due to the fact that the conveyer screws tend to feed more of the mixed material than there is space for in the molding chamber, a pressure is built up therein which is applied to the conveyer screws. The pressure may be built up as desired and to accord to the capacity possessed by the conveyer screws. The pressure employed is that which is most desirable for the particular product to be produced. The compression or pressure imposed on the material must at least rise to a degree that it prevents the heavier ingredients from settling and sinking to the bottom of the mixture. If that were to occur the obtaining of a uniform board or sheet would not be had.

As previously mentioned, the compression is determined by the capacity of the conveyer screws as well as by the durability and strength of the molding chamber. By applying higher pressure, the volume per unit of weight is increased due to the fact that a larger amount of the material is fed into the molding chamber. This method results in the advantage that the volume per unit of weight can be varied to the desired extent.

At the location where the different materials are mixed together namely, below the outlets of the two hopper sections, the pressure is no higher than the weight of the materials themselves. Therefore the mixing of the two materials must be thorough and that is attained by the described structure.

The degree of compression in the molding section can be observed through a manometer and when the compression reaches a point where its maintenance is to be constant, it can be maintained by the displacement of the feeding apparatus. The motor 52 of low speed serves to propel the entire feeding apparatus at the desired speed so that the compression recorded on the manometer can be maintained.

At the conclusion of the molding operation as above described, the material is allowed to cool and it is then removed from the mold and the next molding operation is carried out.

While it is herein suggested that the mixing and feeding apparatus herein described shall deliver its output of the mixed materials into a mold of the construction illustrated, it will be apparent that it might be used for the production of material according to the co-pending application Serial No. 576,052, now abandoned, or in association with other structures that result in continuous production of the product.

With respect to the liquid thermoplastic this can be an adhesive which will set with or without heat after the particles have passed through the mixing screws. Rubber resin based adhesives could be used. When being heated in the mold, the solvent will disappear and the thermoplastic will adhere the mixed particles together. Such liquid could also be a vinyl plastisol dissolved in alcohol. The liquid may also consist of thermo setting plastic such as a melamine or phenol composition.

The product produced by the apparatus and method herein described is one in which a uniform distribution of the vermiculite particles or other particles hereinbefore mentioned is had throughout the piece and in which such particles serve as spacing elements between the expanded thermoplastic beads, thus acting to separate and insulate them. The thermal resistance of the vermiculite for example being more pronounced than that of the thermoplastic, a product more resistant to the effect of heat than is the case when thermoplastic is solely used, is the result.

Having thus described a single embodiment of the invention, it is obvious that the same is not to be restricted thereto, but is broad enough to cover all structures coming within the scope of the annexed claims.

What is claimed is:

1. An apparatus for mixing and molding granules of an expanded synthetic material comprising, a hopper divided into a plurality of chambers containing materials to be mixed and molded, screw conveyers at the bottom of the hopper for receiving, mixing and conveying the materials, a mold chamber having a fixed mold wall and a movable mold wall between which the materials are molded, the screw conveyers communicating with the interior of the mold chamber to thereby deposit the mixed materials therein, tubular means surrounding the screw conveyers and projecting from the hopper, said tubular means being attached to the movable mold wall, and a carriage for the hopper to thereby permit movement of it to and from the mold chamber to cause movement of the movable end wall to or from the fixed end wall.

2. An apparatus for mixing and molding materials comprising, a hopper divided into a plurality of chambers containing the materials to be mixed and molded, conveyers at the outlets of the hopper for receiving, mixing and conveying the materials, a mold chamber spaced away from the hopper and having a fixed mold wall and a movable mold wall, the conveyers communicating with the interior of the mold chamber to thereby deposit the mixed materials therein between the movable mold wall and the fixed mold wall, tubes surrounding the conveyers and projecting from the hopper and extending into the mold chamber, said tubes being attached at one end to the movable mold wall, and driven wheels supporting the hopper to permit movement of it to and from the mold chamber to cause movement of the movable mold wall back and forth within the mold chamber.

3. An apparatus for mixing and blending a synthetic plastic such as polystyrene with another material having different density comprising, a mixing and feeding unit including supply chambers in which the materials are separately contained, a mold chamber, conveying means for receiving and mixing the materials obtained from the supply chambers, said conveying means having an outlet in communication with the interior of the mold chamber whereby the materials handled by the conveying means will be deposited by said conveying means into the mold chamber, an enclosure surrounding the conveying means, a movable wall in the mold chamber, the enclosure being attached to said movable wall and opening therethrough, a carriage for the mixing and feeding unit for permitting movement of said unit to or from the mold chamber to enable material deposited therein by the conveying means to be compressed by movement of the movable wall.

4. An apparatus for mixing and feeding materials comprising, a mixing and feeding unit, a mold chamber including a movable mold wall, means fixedly coupling the unit to the movable mold wall, propelling means providing relative movement between the feeding unit and the mold chamber, conveying means included in said unit and said conveying means being operative to deposit mixed material through the movable mold wall and into the mold chamber beyond the movable mold wall.

5. An apparatus for mixing and conveying granular materials comprising, a wheeled unit, propelling means by which said unit is movable back and forth, a multi-section hopper forming a part of said unit and in which materials to be mixed and molded are contained, a rotative feeder at the outlet end of one of the sections of the hopper, spiral conveyers at the bottom of the hopper for receiving materials therefrom, said conveyers being movable as a part of the unit the conveyers being provided with mixing blades, tubes extending from the hopper and in which the spiral conveyers are rotative, a mold chamber, means for directing steam into the mold chamber, a movable wall slidable axially in the chamber, the tubes being connected to and passing through the wall whereby the conveyers within said tubes will deliver the mixed material into the mold chamber between the movable wall and an end wall of the chamber, and the unit by its movement toward the mold chamber will compress the material between the said walls.

6. An apparatus of the character described comprising, a hopper divided into two sections by a vertical wall, a paddle-wheel feeder operative at the lower end of one of the hopper sections to feed granular material received from said section, the other hopper section having a delivery opening at its lower end, a plurality of spiral conveyers located in side-by-side relationship at the bottom of the hopper below the feeder and delivery opening and receiving materials therefrom, means carried by the spiral conveyers for mixing the materials while the materials are being conveyed, supporting means for the hopper including wheels on which the hopper is moved back and forth, tubes extending from the hopper and in which the conveyers are rotative, a heated mold chamber having a movable mold wall located within it, said wall being connected to the tubes and being movable back and forth within the mold chamber by movements of the hopper, the spiral conveyers depositing mixed materials out of the tubes and through the movable end wall and into the mold chamber.

References Cited by the Examiner
UNITED STATES PATENTS

| | | | |
|---|---|---|---|
| 72,573 | 12/67 | Weissenbarn | 18—30 |
| 663,103 | 12/00 | Schlickeysen | 25—14 |
| 873,559 | 12/07 | Koontz | 25—11 |
| 1,320,128 | 10/19 | Felix | 18—2 |
| 1,858,956 | 5/32 | Hepperle | 25—14 |
| 2,295,823 | 9/42 | Banigan et al. | 18—48 |
| 2,944,292 | 7/60 | Norrhede | 18—48 |
| 2,951,260 | 9/60 | Harrison et al. | 18—5 |
| 2,983,963 | 5/61 | Jodell | 18—59 |
| 2,987,774 | 6/61 | Jacobson | 18—48 |
| 2,994,670 | 8/61 | D'Alelio | 260—2.5 |
| 2,996,756 | 8/61 | Korsch et al. | 18—5 |
| 2,999,822 | 9/61 | Pfau et al. | 260—2.5 |
| 3,090,078 | 5/63 | Ackler | 18—59 |

MICHAEL V. BRINDISI, *Primary Examiner.*

WILLIAM J. STEPHENSON, *Examiner.*